United States Patent
Danjes et al.

[15] 3,642,260
[45] Feb. 15, 1972

[54] DEVICE FOR AERATING SEWAGE WATER

[72] Inventors: Martin Danjes, Hermannstr. 3, Detmold; August Schreiber, Bohnhofstr. 45, Vinnhorst, both of Germany

[22] Filed: Aug. 4, 1969

[21] Appl. No.: 847,037

[30] Foreign Application Priority Data

Aug. 3, 1968 Germany...................P 17 84 398.0

[52] U.S. Cl.................................................261/122
[51] Int. Cl................................................B01f 3/04
[58] Field of Search........................................261/122

[56] References Cited

UNITED STATES PATENTS

| | | |
|---|---|---|
| 1,792,286 | 2/1931 | Curry et al...............................261/122 |
| 2,978,234 | 4/1961 | Lamb.......................................261/122 |
| 3,063,689 | 11/1962 | Coppock..........................261/122 UX |
| 3,279,773 | 10/1966 | Schwartz................................261/122 |
| 3,432,154 | 3/1969 | Danjes....................................261/122 |

*Primary Examiner*—Tim R. Miles
*Attorney*—Watson, Cole, Grindle & Watson

[57] ABSTRACT

The device for aerating sewage water by means of minute bubbles consists of a flat elastic air tube which is disposed below the water surface and comprises a membranelike upper wall provided with a plurality of small air discharge ports which ports are pierced by needles with oval or triangular cross section and a lower unpierced wall of greater thickness than the upper wall. The longitudinal edges of both walls are formed as looplike pockets enclosing two parallel horizontal supporting members which are arranged with a distance from each other for prestressing the air tube in transverse direction.

2 Claims, 7 Drawing Figures

DEVICE FOR AERATING SEWAGE WATER

The invention relates to a device for aerating waste or sewage water with minute bubbles by means of aerating elements arranged beneath the water surface and provided with air discharge ports.

Using the activated-sludge method for biologically purifying sewage water depends to a large extent in its effect on the size and the uniformity of the bubbles formed for aeration to allow for the absorption of the greatest possible amount of oxygen.

At present, ceramic filters are used as aerating elements. They are fine-pored but show, however, a nonuniform structure with air ducts of varying size and discharge ports in close proximity of each other from which air leaves in form of bubbles with different size. Besides, on account of the sludge particles and bacteria contained in the sewage water, the ducts of the ceramic filter bodies easily coalesce when no air is admitted through them or the air supply decreases below a certain amount. Filters of this type can only be operated at a constant volume of air, and augmenting it would result in considerably increasing the passage resistance of the filters.

It is an object of the invention to provide for aeration of sewage water by means of minute bubbles subject to an extensive range of control such that aerating is possible even after a prolonged interruption of the air supply.

Another object of the invention is the provision of means protecting the air discharge ports of the aerating elements as well as the air supply lines from intruding sewage water without taking recourse to auxiliary means such as back pressure flaps or similar.

Still another object is the provision of means to facilitate the mounting or dismounting the aerating elements.

A further object of the invention is to provide the air discharge ports of the aerating element in such a manner that they are automatically closed when no pressure is exerted from the interior of the aerating member or when only external water pressure is prevalent.

These and other objects of the invention will become apparent from the following description which is made in connection with the accompanying drawings in which several embodiments of the invention are shown for the purpose of illustration. In the drawings.

Figure 1:
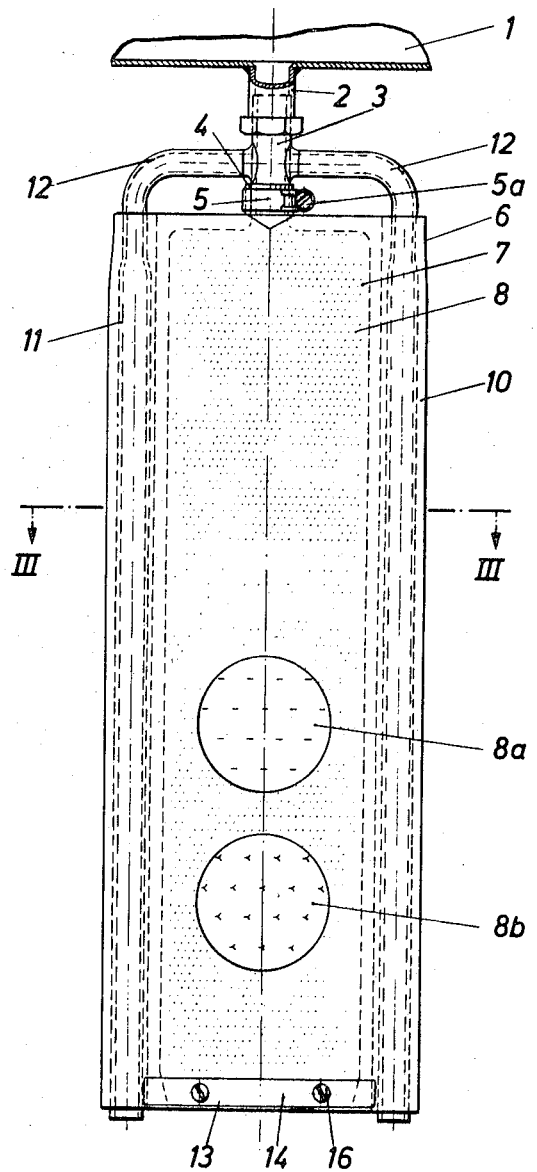
FIG. 1 is a plan view of an aerating member.
Figure 2:
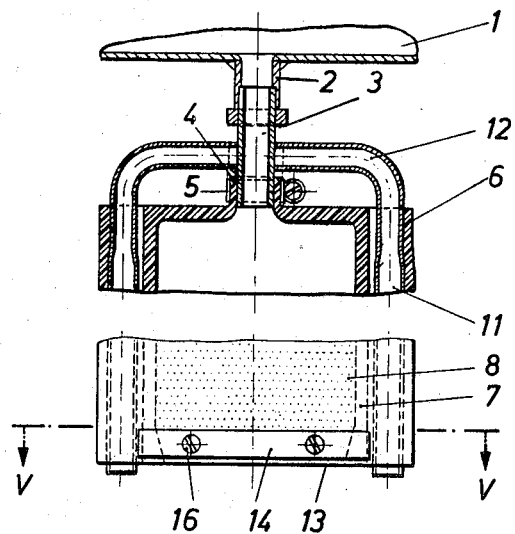
FIG. 2 is a horizontal section and a partial plan view of an aerating member of an additional embodiment.

The aerating element according to the invention as described above comprises a flat elastic air tube provided with a plurality of air discharge ports on its upper wall, its longitudinal sides being formed as loops or pockets for receiving supporting members, one end of said tube is connected to an air supply line and the other end of said tube is sealed. The supporting members are preferably of the bar-type structure and are arranged at an interval from each other such that the air tube in transverse direction is prestressed in its flat, pressureless position by way of the supporting elements lodged inside said loops.

The air discharge ports of the aerating element are in the form of pin-pricks which are closed on account of the elasticity of the air tube when no air is admitted. These pin-pricks open up to form air discharge ports only when a certain internal pressure of the aerating elements is reached. Since the air tube is subjected to prestressing by way of the supporting members, its upper and lower wall come to lay closely on top of each other, thus closing the air discharge ports of the upper air tube wall when the air tube is not kept under pressure.

If, due to an interrupted air supply, any quantities of air or water would have possibly penetrated into the air tube, they will be expelled through the air discharge ports not only due to the elasticity of the air tube walls but also due to the prestressing exerted by both supporting members on the air tube. Even extended interruption of operation will, therefore, not allow water to enter the air tube.

When air is supplied, both sides of the air tube expand and the discharge ports are opened permitting the air to enter the sewage water in form of minute bubbles of equal size. If these pricked air discharge ports become partially clogged by incrustation of the air supply line or by dust contained in the air and the exhaust resistance of the air discharge ports is increased thereby, it is possible to expand the tube by feeding a greater quantity of air than would normally be necessary for aeration purposes and thus to open up the airports to a larger extent such that any sedimentation having formed itself is dislodged and expelled by the air pressure. In this manner, the air discharge ports remain clean at all times and are effectively protected from clogging by any sludge particles or bacteria contained in the sewage water.

According to additional features of the embodiment presented, the air discharge ports are pricked or pierced by means of needles of approximately oval cross section at the tip. To prevent the membrane-type wall from being torn when pricked with the needles, it is recommended to arrange the air discharge ports in such a manner that the needles are applied with their oval cross section transversely to the longitudinal axis of the aerating member. The air discharge ports take, therefore, the form of slotted vents in transverse direction of the air tube while, at the same time, the consistency of the air tube with respect to prestressing and also with respect to the blown up condition is maintained because, in this manner, pricking of the wall is always effected only in transverse direction. Contrariwise, using needles of circular cross section would tear the wall in a direction dependent on the type of material used, affecting the durability of the air tube as well as the uniform aeration of the sewage water.

It is an additional feature of the invention to have the needles for pricking the air discharge ports take the form of a three-cornered tip. The ports generated thereby in the membrane are bordered by triangular flaps or tongues working like valve flaps affording particularly good protection, at a low-passage resistance of the out going air, against the penetration of water into the deflated air tube.

In a preferred embodiment of the invention the air discharge ports are uniformly distributed over the entire surface area of the upper wall of the flat air tube. The number of holes per surface unit, the distance from center to center of the holes as well as the entire opening given by the size of the pricking needles can be determined depending on the consistency or viscosity of the medium to be aerated. In this connection, it is recommended to select a closer interval of the holes for media of low viscosity and a larger interval for thickly liquids, such as a thick sludge mixture.

These pierced membranes can be produced in a simple manner by using a plate-type tool in which the needles have been prearranged in quantity, disposition and direction. A needle pack tool of this type is then pressed onto the membrane appropriately positioned on an elastic pad, e.g., on a foamy plastic.

The membrane pierced in this manner is then cemented together or welded with an unpierced membrane forming the lower side of the air tube; their longitudinal sides form loops for receiving the supporting elements.

This wall of the unpierced lower membrane is suitably made thicker than that of the upper perforated membrane.

The individual aerating elements constituted in this way can be readily passed over both supporting members without the use of tools. They can easily be replaced should this become necessary after a long time of working.

The supporting members are preferably horizontal bars appropriately mounted to an air supply line at a distance necessary for prestressing said air tube.

In order to facilitate mounting and removing the air tube it is possible to provide e.g., bar-shaped stretching elements inside the loops receiving the supporting members. After the air tube has been passed over the supporting members said stretching elements can be lodged inside the loops alongside the air tube, prestressing in this way the tube walls.

Joint or clamping plates tightened by screws can be appropriately used at the end of the air tube opposite to the air supply opening, serving not only as spacers for the supporting elements but also as detachable seal of the tube end wherethrough easy access is gained into the interior of the air tube to wash it out and to remove any sediments or impurities therefrom.

According to another feature of the invention guide or slide faces are provided on the external edges of the loops of the pocket-shaped air tube, which loops receive the supporting elements. Said slide faces may also be formed by correspondingly prolonging the walls of the air tube. If a stationary aerating element of this type is equipped with slide faces on both longitudinal sides and is mounted in a sloping position normal to the longitudinal axis of the aerating tube, the sewage water in the aeration tank begins to circulate due to a resultant horizontal component or, in the case of a circulating tank, the entire contents of the tank will circulate. Aerating elements of this type can be mounted on a mobile turning bridge. The slide faces provided on the longitudinal sides thereof would produce a reacting force on the bridge putting it into revolving motion when air is supplied.

Using this type of pocket-shaped aerating element of larger width, it is possible to arrange the air discharge ports thereon in groups in the form of several adjacent fields separated from each other by one nonpricked strip whereby both walls of the air tube are connected with one another. In this way the entire surface of the aerating element is subdivided into several longitudinal strips with the advantage that an extensive buldging of the air tube is prevented when air is supplied.

An aerating element of the pocket-shaped type described may also be manufactured of elastic material of other than elastic rubber such as synthetic or similar material resistant to sewage water.

Referring now especially to FIGS. 1 to 4 of the drawings, an air supply pipe 1 connected to blowers, not shown, is equipped with a tube socket 2 having a tube nipple 3 screwed thereon. A nose-shaped extension 4 of an aeration element 6 is passed over said nipple 3 and is hermetically secured by means of a clamp 5 and a clamp screw 5a attached thereon. The aeration element 6 comprises a flat pocket-shaped air tube with an upper wall 7 consisting in a thin rectangular elastic rubber membrane provided with numerous small airports 8 distributed uniformly over its surface.

These airports 8 have been obtained by pricking the upper wall 7 of the air tube 6 with sharp needles. The lower wall 9 of the air tube consists in a rectangular unpierced rubber membrane of larger thickness than the upper wall 7.

The upper and lower walls 7 and 9 of the air tube 6 are joined hermetically by agglutination, welding or vulcanizing on both parallel longitudinal sides forming a looplike pocket 10 each of which encloses a supporting member 11 consisting in a flat hollow rod. Both supporting members 11 are arranged in a horizontal plane parallel to each other and attached, e.g., by welding, to the nipple 3 via a quarter bend or elbows 12. The extremity 13 of the air tube 6 opposite to the air supply pipe 1 is sealed by means of two joint plates or straps 14, 15 clamped together by two-fixing screws 16 pressing the tube walls 7 and 9 airtight against one another.

Both supporting members 11 are spaced from each other such that the air tube 6 being in a flat position and fitted over loops 10 is in prestressed condition when not filled with air, whereby the upper and lower walls thereof, 7 and 9 respectively, come to lie almost closed upon each other. In this connection, any air still contained in the air tube 6 or any sewage water newly entering will be pressed out through the air discharge ports 8. Also no water can come in from the outside through the air discharge ports 8 into the air tube 6 if no air is supplied thereto, since the air discharge ports 8 contract due to the prestressing of the rubber membrane forming the upper side 7 of the air tube 6 while its lower, thicker wall 9 closes the air discharge ports 8 from the inside.

Figure 3:
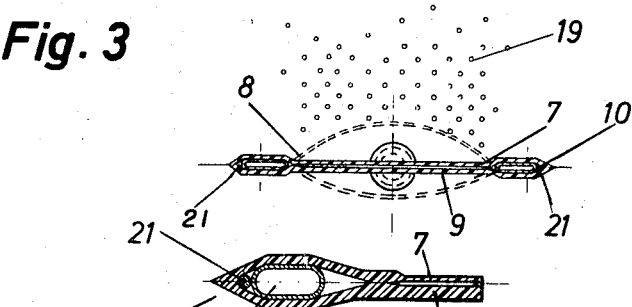
FIG. 3 is a vertical cross section taken in the plane III—III of FIG. 1.
Figure 4:
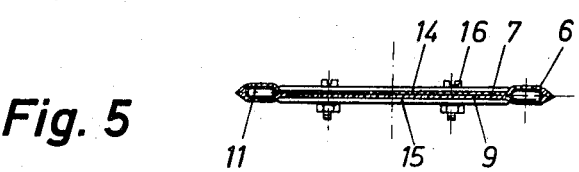
FIG. 4 is a vertical cross section taken in the plane IV—IV of FIG. 2.
Figure 5:
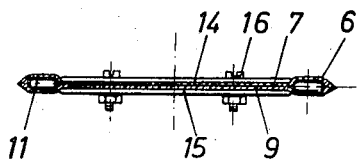
FIG. 5 represents a part of FIG. 4 on an enlarged scale.

When air under pressure is fed into the air tube 6 via air supply pipe 1, the upper and lower walls 7 and 9, respectively, bulge out as shown by the dashed lines in FIG. 3, whereas the lower tube wall 9 does not bulge out as strongly, on account of its greater thickness, as the upper wall 7. The air passing through the aerating channel formed by the bulging of the air tube 6 is given off as uniformly distributed minute bubbles 19 into the ambient water via the air discharge ports 8.

When the air supply is interrupted, both tube sides 7 and 9 will be pressed together, as described, due to the hydrostatic pressure of the ambient water, thus closing the pin-pricked discharge ports 8. Since, even when operation is interrupted for a long time or the air supply is continually severed, no water will pass through the air discharge ports 8 into the air tube 6, which ports will remain clean, assuring at all times immediate readiness for operation of the aeration elements. It is thus possible, with a purification plant equipped with aerating elements of this type to insure, without any difficulties, minute bubble aeration in intermittent operation at any time.

Figure 6:
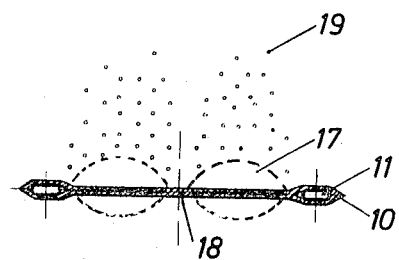
FIG. 6 is a cross section of an additional variant in accordance with the invention and FIG. 7 is a cross section of another embodiment of an aerating member.

In order to arrive at a similar uniform outflow of air through the discharge ports 8 when air is supplied through air tubes 6 having a larger width, it is possible to provide the upper tube wall 7 with discharge ports 8 arranged in groups of two or several adjacent fields 17, as shown, by way of example, in FIG. 6.

In this drawing, the fields 17 having pierced or pricked air discharge ports 8 are arranged adjacent to each other interconnecting therebetween an unpierced center strip 18. In said center strip 18 both tube walls 7 and 9 can be joined, e.g., by welding, at intervals with each other once or several times. In this way, the entire surface of the air discharge ports 8 of wall 7 is subdivided into two or several groups. In this way excessive bulging of the air tube 6 is prevented when air is supplied, which bulging would produce the form shown by the dashed lines of FIG. 6, permitting the air to enter the sewage water in form of minute bubbles 19.

At 8a of FIG. 1 the air discharge ports 8 are shown on an enlarged scale. Said ports are preferably pricked into the upper tube wall 7 by means of needles having had their tips ground to an oval cross section. In this way the air discharge ports take the form of slotted vents transverse to the longitudinal axis of the air tube 6. The strength of the perforated tube wall 7 will not be adversely affected by the prestressing and the bulging occurring during air supply on account of the slotted shape of the discharge ports 8, as would frequently be the case when using needles of circular cross section for piercing said holes.

It is also possible to obtain said air discharge ports 8 by piercing the tube wall 7 with needles whose points have been ground not to an oval but to a three-cornered shape, as is illustrated on an enlarged scale at 8b of FIG. 1. In this way air discharge ports are formed which are bordered by slotted triangular flaps or tongues with their points and legs lying contiguous one to another.

The needles for obtaining said air discharge ports 8 in the upper membranelike tube wall 7 have a diameter of approximately 0.5 to 0.8 mm. The diameter and the distance of the air discharge ports from each other is preselected in accordance with the viscosity and the consistency of the sewage water to be aerated; selecting a larger distance of the air discharge ports from each other for thickly liquids than for liquids of low viscosity.

Figure 7:
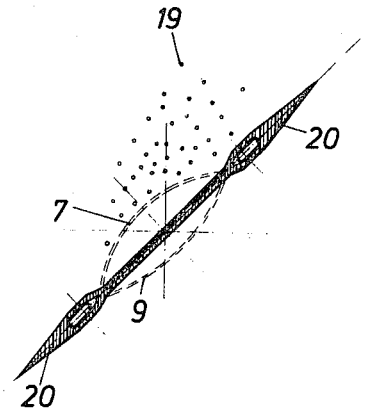

The embodiment of FIG. 7 shows slide faces 20 provided at the external edges of the loops 10 formed of the upper and lower tube walls 7 and 9. Said slide faces 20 should be suitably made of rigid material. When the air tube 6 is stationary in a sloping position normal to its longitudinal axis these slide faces 20 produce a horizontal movement of the sewage water in the aeration tank on account of the horizontal component of the air bubbles 19 due to aeration. Using an annular circulation tank would result in circulating the contents of the tank.

The air tube 6 can be removed from both supporting members 11 by releasing clip 5a and disengaging the clamp 5 from the nipple 3. The tube can be easily exchanged without having recourse to special tools. For easy mounting and removing the air tube on or from the supporting members 11 a round bar-type stretcher element 21 is provided adjacent to the supporting members 11, in accordance with FIG. 3 and 4, which can be inserted beside the supporting member 11 after mounting the air tube 6 in the loops 10, resulting in the necessary prestressing of the air tube 6 due to the lateral pull exerted thereby. During disassembly the stretcher element 21 is withdrawn from the loop 10 permitting the slack air tube 6 to be easily pulled from the supporting members 11.

The invention provides for completely uniform aeration of sewage water by means of minute bubbles over the entire area of aeration and for any volume of air contemplated such that a larger operational range is preserved.

It is to be understood that the aeration device according to the invention may be arranged at any desired water depth since the issue of fine bubbles and the protection of the airholes against blockage at intermittent operation of the device is safeguarded even when the aeration device is lowered to the deepest levels occurring in practical use.

The embodiments of the invention shown in the drawings are meant to be examples only, and they may be modified without departing from the spirit of the invention.

What we claim is:

1. A device for aerating sewage water by minute bubbles with an aeration element arranged beneath the water surface and consisting of a flat air tube, the upper wall of said air tube made of a resilient foil bulging out when pressurized air is admitted into said air tube and collapsing when air admittance is interrupted, said upper wall provided with a plurality of air discharge ports, the longitudinal edges of said air tube are formed as looplike pockets enclosing two horizontal supporting members, in which the improvement comprises an elastic membranelike upper wall of said air tube, air holes pierced into said upper wall by means of needles, which holes expand to form air discharge ports when the air tube is under excessive internal pressure, the improvement further comprises a lower wall of said air tube and an airspace between said upper wall and said lower wall, said airspace communicating with said airholes of said upper wall, and including stretcher elements positioned in the looplike pockets.

2. A device according to claim 1, wherein the stretcher elements comprise bars which are inserted into the loops alongside of the supporting members.

* * * * *